United States Patent
Chen

(10) Patent No.: US 9,500,227 B2
(45) Date of Patent: Nov. 22, 2016

(54) HYDRODYNAMIC BEARING STRUCTURE FOR COOLING FAN AND METHOD FOR ASSEMBLING THE SAME

(71) Applicant: TUNG PEI INDUSTRIAL CO.,LTD., Taipei (TW)

(72) Inventor: Yu-Yueh Chen, Taoyuan County (TW)

(73) Assignee: TUNG PEI INDUSTRIAL CO., LTD., Taipei (TW)

( * ) Notice: Subject to any disclaimer, the term of this patent is extended or adjusted under 35 U.S.C. 154(b) by 0 days.

(21) Appl. No.: 14/664,995

(22) Filed: Mar. 23, 2015

(65) Prior Publication Data

US 2015/0267741 A1  Sep. 24, 2015

(30) Foreign Application Priority Data

Mar. 24, 2014 (TW) .............................. 103110865 A

(51) Int. Cl.

| F16C 17/10 | (2006.01) |
|---|---|
| F16C 33/10 | (2006.01) |
| F16C 43/02 | (2006.01) |
| F04D 29/051 | (2006.01) |

(Continued)

(52) U.S. Cl.
CPC ............ *F16C 33/107* (2013.01); *F04D 29/057* (2013.01); *F04D 29/0513* (2013.01); *F16C 17/107* (2013.01); *F16C 43/02* (2013.01); *F04D 17/16* (2013.01); *F04D 29/668* (2013.01); *F16C 17/08* (2013.01); *Y10T 29/49639* (2015.01)

(58) Field of Classification Search
CPC .. F04D 17/16; F04D 29/0513; F04D 29/057; F04D 29/668; F16C 17/026; F16C 17/08; F16C 17/107; F16C 17/102; F16C 43/02; F16C 2360/46; Y10T 29/49639; H02K 5/1675

USPC ........ 384/100, 107, 112, 114, 121, 123, 119, 384/124; 28/898.02; 29/898.02, 898.041
See application file for complete search history.

(56) References Cited

U.S. PATENT DOCUMENTS 5,357,163 A * 10/1994 Minakuchi ............ F16C 17/026
                                                        310/156.05
5,559,382 A * 9/1996 Oku ....................... F16C 17/026
                                                        310/67 R (Continued)

FOREIGN PATENT DOCUMENTS

| CN | 2168982 Y | 6/1994 | |
|---|---|---|---|
| DE | 102007005516 A1 * | 8/2008 | ............. H02K 7/085 |

(Continued)

*Primary Examiner* — Marcus Charles
(74) *Attorney, Agent, or Firm* — Li & Cai Intellectual Property (USA) Office

(57) ABSTRACT

Disclosed are a hydrodynamic bearing structure for bearing a cooling fan and a method of assembling the same. The hydrodynamic bearing structure comprises a housing, a hydrodynamic bearing, a rotation shaft, a thrust member and a bottom plate. The hydrodynamic bearing is mounted in an accommodating space within the housing. The rotation shaft is disposed through a rotation shaft hole of the hydrodynamic bearing. The thrust member is disposed on an end portion of the rotation shaft and accommodated between a bottom surface of the hydrodynamic bearing and a top surface of the bottom plate. A plurality of guiding grooves are disposed in a surface of the thrust member, so that an oil layer applied with pressure is formed on the surface of the thrust member to maintain stable rotation of the rotation shaft and reduce the deflection and vibration of the fan during rotation.

9 Claims, 8 Drawing Sheets

(51) Int. Cl.
*F04D 29/057* (2006.01)
*F04D 17/16* (2006.01)
*F04D 29/66* (2006.01)
*F16C 17/08* (2006.01)

(56) References Cited

U.S. PATENT DOCUMENTS

| | | | | |
|---|---|---|---|---|
| 5,789,836 A | * | 8/1998 | Hayakawa | F16C 33/1035 310/156.26 |
| 6,034,454 A | * | 3/2000 | Ichiyama | F16C 17/107 384/115 |
| 6,250,807 B1 | | 6/2001 | Mori et al. | |
| 6,507,135 B1 | * | 1/2003 | Winkler | F04D 29/051 310/51 |
| 6,661,131 B2 | * | 12/2003 | Fukutani | H02K 1/28 310/154.01 |
| 6,700,241 B1 | * | 3/2004 | Horng | G11B 19/2009 310/67 R |
| 6,832,853 B2 | * | 12/2004 | Fujinaka | F16C 33/103 384/100 |
| 7,518,276 B2 | * | 4/2009 | Aiello | F16C 17/02 310/90 |
| 7,521,830 B2 | * | 4/2009 | Chen | F16C 33/103 310/90 |
| 7,600,919 B2 | * | 10/2009 | Hong | F16C 33/1085 384/100 |
| 7,614,791 B2 | * | 11/2009 | Shishido | F16C 33/107 360/99.08 |
| 8,084,907 B2 | * | 12/2011 | Kim | G11B 19/2009 310/51 |
| 8,210,748 B2 | * | 7/2012 | Hori | F16C 17/107 384/100 |
| 8,353,630 B2 | * | 1/2013 | Shida | F16C 17/105 29/898.02 |
| 2004/0076350 A1 | * | 4/2004 | Gomyo | F16C 17/04 384/100 |
| 2005/0058374 A1 | * | 3/2005 | Gomyo | F16C 33/103 384/119 |
| 2007/0217721 A1 | * | 9/2007 | Asada | F16C 17/107 384/100 |
| 2008/0279492 A1 | * | 11/2008 | Obara | F16C 17/105 384/100 |

FOREIGN PATENT DOCUMENTS

| | | | | |
|---|---|---|---|---|
| GB | 1222275 | | 2/1971 | |
| JP | 09060645 A | * | 3/1997 | |
| JP | 09072343 A | * | 3/1997 | |
| JP | 2002155944 A | * | 5/2002 | |
| JP | 2006234121 A | * | 9/2006 | F16C 17/10 |
| JP | 2010249218 A | | 11/2010 | |
| JP | 2011021649 A | * | 2/2011 | |
| KR | 20040003265 A | * | 1/2004 | |
| TW | M300726 | | 11/2006 | |
| TW | M484244 U | | 8/2014 | |

* cited by examiner

HYDRODYNAMIC BEARING STRUCTURE FOR COOLING FAN AND METHOD FOR ASSEMBLING THE SAME

TECHNICAL FIELD

The present invention relates to a hydrodynamic bearing structure for bearing a cooling fan and a method for assembling the same, and in particular, to a hydrodynamic bearing structure for bearing a cooling fan for use in a cooling module, and a method for assembling the same.

BACKGROUND ART

Cooling fans are one of the main components in a cooling module. In recent years, with the trend that information products such as notebook computers and tablet personal computers are increasingly miniaturized and thinned and operation power of a processor thereof is greatly increased, a cooling module needs be miniaturized and thinned and have increased cooling efficiency. Therefore, a fan used by the cooling module must have a reduced volume, a reduced thickness, and an increased rotation speed. In order to satisfy the requirements for the miniaturization, thinning, and high rotation speed of the fan, many cooling fans currently use the design of hydrodynamic bearings in place of traditional bearings.

As shown in FIG. 8 and FIG. 9, a conventional cooling fan structure using a hydrodynamic bearing is shown. The cooling fan structure comprises a cooler housing 1, a bearing device 2 disposed on a bottom plate of the cooler housing 1, and a fan blade 3 disposed on an upper end of a rotation shaft 6 of the bearing device 2. A rotor 4 is further disposed on the fan blade 3 and a stator 5 is disposed on the bottom plate of the cooler housing 1. The rotor 4 and the stator 5 cooperate with each other to generate mutually exclusive magnetic fields for driving the fan blade 3 to rotate about the rotation shaft 6. As shown in FIG. 9, the bearing device 2 in the prior art includes: a housing 7, a hydrodynamic bearing 8 disposed in the housing 7, a compression ring 7a for fixing the hydrodynamic bearing 8 into the housing 7, and a rotation shaft 6 disposed through the hydrodynamic bearing 8.

The housing 7 has a cylindrical accommodating space therein. The hydrodynamic bearing is disposed in the accommodating space. A bottom plate 7b is integrally formed on a bottom of the housing 7 so that a closed space is formed between the accommodating space in the housing and a bottom surface of the hydrodynamic bearing 8, where the closed space is filled with a lubricating oil. A anti-friction pad 9 is disposed on a top surface of the bottom plate 7b and a bottom end of the rotation shaft 6 contacts a surface of the anti-friction pad 9 so that the bottom end of the rotation shaft 6 is supported by the bottom plate 7b. As shown in FIG. 9A, a herringbone groove 8a is disposed in a surface of an inner hole of the hydrodynamic bearing 8. The herringbone groove 8a functions to guide the lubricating oil to flow and pressing the lubricating oil when the rotation shaft 6 rotates. Therefore, an oil layer applied with pressure is formed between the rotation shaft 6 and the rotation shaft hole of the hydrodynamic bearing 8, so that the rotation shaft 6 will not contact a surface of the hydrodynamic bearing 8 when the fan operates, reducing a friction force during operation of the rotation shaft 6 and reducing abrasion of the hydrodynamic bearing 8 and the rotation shaft 6 during high-speed operation of the fan.

The main problem of the hydrodynamic bearing structure used for the conventional cooling fan is that, because the fan blade 3 has a very large diameter and the rotor 4 is disposed on the blade, vibration and deflection easily occur when the fan blade 3 operates, which results in not only vibration and noises in operation, but also abrasion of the rotation shaft 6 and the hydrodynamic bearing 8.

However, only radial support exists between the rotation shaft 6 and the hydrodynamic bearing 8 in the bearing device 2 without axial support, and an axial length of a joint between the rotation shaft 6 and the hydrodynamic bearing 8 is much less than the diameter of the cooling fan due to the flat design of the fan, so that support between the rotation shaft 6 and the hydrodynamic bearing 8 is insufficient, and thus the problem of the deflection and vibration during operation of the fan cannot be solved.

In addition, because the housing 7 of the bearing device 2 and the bottom plate on the bottom thereof are integrally formed, the rotation shaft 6 must be inserted into the hydrodynamic bearing 8 from an upper end of the hydrodynamic bearing 8 when the bearing device 2 is assembled, so that no additional positioning structure can be disposed on the rotation shaft 6, and thus the problem of insufficient support and positioning between the rotation shaft 6 and the hydrodynamic bearing 8 cannot be solved.

Furthermore, in the construction of the conventional bearing device 2, the anti-friction pad 9 disposed on the bottom of the housing 7 is a very thin sheet separated from the bottom plate 7b, so the anti-friction pad 9 is easily bent and deformed after being used for a long time.

In view of the above, the hydrodynamic bearing structure used for conventional cooling fans has many disadvantages. Therefore, it has become an important object in the art to improve operation stability of the hydrodynamic bearing structure used for conventional cooling fans to overcome the aforementioned disadvantages, through improvements in structural design.

SUMMARY OF THE INVENTION

The main objective of the present invention is to provide a hydrodynamic bearing structure for bearing a cooling fan, which is capable of improving operation stability and reducing deflection of a rotor of the cooling fan.

According to an embodiment of the present invention, a hydrodynamic bearing structure for bearing a cooling fan mainly comprises: a housing, a hydrodynamic bearing, a rotation shaft, a thrust member, and a bottom plate. The housing has a cylindrical accommodating space therein and an upper opening communicating with the accommodating space is provided at an upper end of the housing. The bottom plate is made of a anti-friction material and disposed at a bottom of the housing so that a bottom of the bottom plate is in a closed state. The hydrodynamic bearing is disposed in the accommodating space and a rotation shaft hole extending through a top surface and a bottom surface of the bearing is provided in the center of the hydrodynamic bearing. The rotation shaft is disposed in the rotation shaft hole of the hydrodynamic bearing, where an upper end of the rotation shaft protrudes from the top surface of the hydrodynamic bearing and a bottom end of the rotation shaft protrudes from the bottom surface of the hydrodynamic bearing and contacts a top surface of the bottom plate. The thrust member is fixedly connected to the bottom end of the rotation shaft and accommodated between the bottom surface of the hydrodynamic bearing and the bottom plate.

A space in the accommodating space between the bottom surface of the hydrodynamic bearing and the top surface of the bottom plate is filled with a lubricating oil. The thrust member is a circular plate and a plurality of radially arranged guiding grooves are disposed on a top surface or a bottom surface of the thrust member. When the thrust member rotates, the guiding grooves disposed in the top surface of the thrust member interact with the bottom surface of the hydrodynamic bearing or the guiding grooves disposed in the bottom surface of the thrust member interact with the top surface of the bottom plate, so that the guiding grooves disposed in the top surface or the bottom surface of the thrust member guide the lubricating oil to flow and press the lubricating oil, thereby forming an oil layer applied with pressure on a surface of the thrust member to maintain rotation stability of the thrust member.

In this embodiment, a fan blade is further disposed at a top end of the rotation shaft, a rotor is disposed on the fan blade, and the rotor and a stator cooperate with each other to generate mutually exclusive pushing forces, thereby driving the fan blade and the rotation shaft to rotate.

The beneficial effects of the present invention are that, when the rotation shaft rotates, the thrust member is carried by the rotation shaft to rotate, and when the thrust member rotates, the grooves in the surface of the thrust member press the lubricating oil so that the lubricating oil on the surface of the thrust member is applied with pressure, thereby maintaining rotation stability of the rotation shaft and reducing the deflection of the rotor on the fan blade.

In order to further understand the features and technical content of the present invention, reference is made to the following detailed description and accompanying drawings of the present invention. However, the accompanying drawings are only intended for reference and illustration, but do not limit the present invention.

DETAILED DESCRIPTION OF THE PREFERRED EMBODIMENTS

Figure 1:
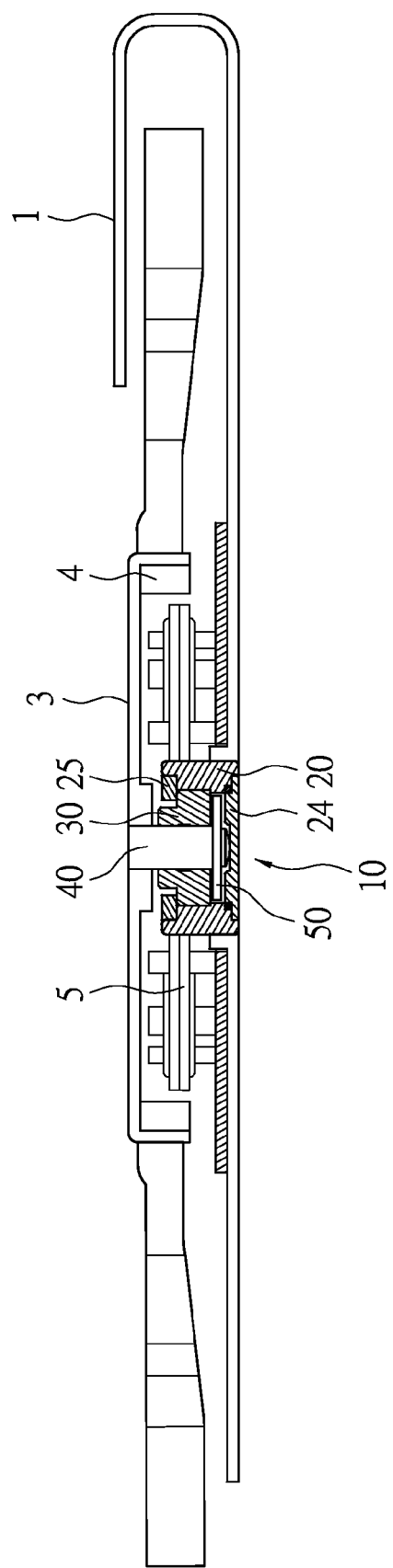
FIG. 1 is an assembled sectional schematic view showing that a hydrodynamic bearing structure of the present invention is mounted on a cooling fan.
Figure 2:
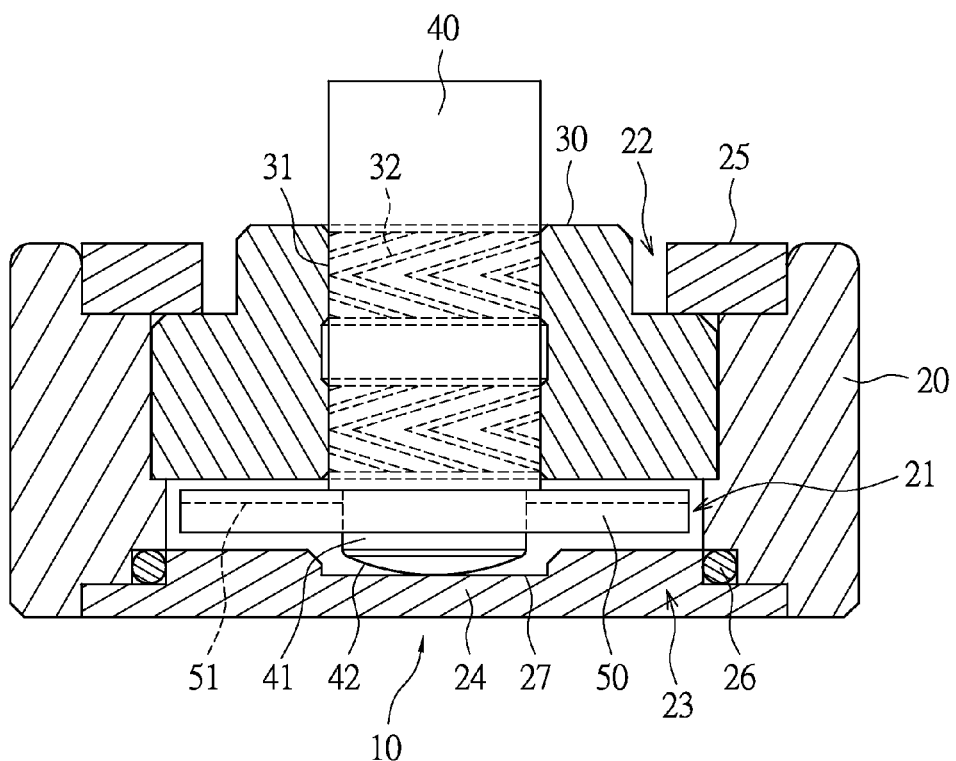
FIG. 2 is an assembled sectional view of the hydrodynamic bearing structure of the present invention.
Figure 2A:
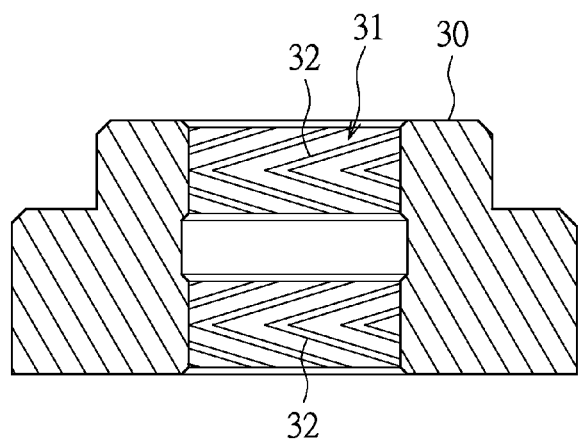
FIG. 2A is a sectional view of a hydrodynamic bearing of the present invention.

FIG. 1 is a schematic constructional view showing that a hydrodynamic bearing structure 10 of the present invention is mounted on a cooling fan and FIG. 2 is an assembled sectional view of the hydrodynamic bearing structure 10 of the present invention.

As shown in FIG. 1, the hydrodynamic bearing structure 10 of the present invention is mounted on a surface of a bottom plate of a cooler housing 1. The hydrodynamic bearing structure 10 has a rotation shaft 40, and a fan blade 3 is disposed on a top end of the rotation shaft 40. A rotor 4 is disposed on the fan blade 3 and the rotor 4 and a stator 4 disposed on the bottom plate of the cooler housing 1 cooperate with each other to generate mutually exclusive magnetic fields for driving the fan blade 3 to rotate.

As shown in FIG. 2, the hydrodynamic bearing structure 10 of the present invention comprises a housing 20, a hydrodynamic bearing 30, a rotation shaft 40, a thrust member 50, and a bottom plate 24. The housing 20A has a cylindrical accommodating space 21 therein and an upper opening 22 communicating with the accommodating space 21 is provided at an upper end of the housing 20.

The hydrodynamic bearing 30 is disposed in the accommodating space 21 in the housing 20. A rotation shaft hole 31 extending through a top surface and a bottom surface of the hydrodynamic bearing 30 is provided in the center of the hydrodynamic bearing 30. The rotation shaft 40 is disposed through the rotation shaft hole 31. An upper end of the rotation shaft 40 protrudes from the top surface of the hydrodynamic bearing 30 and a bottom end of the rotation shaft 40 protrudes from the bottom surface of the hydrodynamic bearing 30. A compression ring 25 is further disposed on a top surface of the housing 20 to fix the hydrodynamic bearing 30 into the accommodating space.

Figure 3:
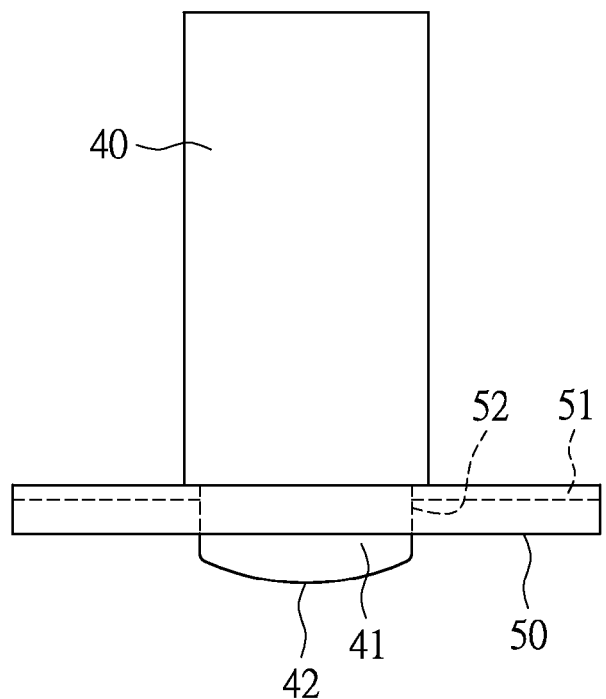
FIG. 3 is an assembled side view of a rotation shaft and a thrust member for the hydrodynamic bearing of the present invention, where guiding grooves are disposed in a top surface of the thrust member.

As shown in FIG. 2 and FIG. 3, an end portion 41 is provided on a bottom of the rotation shaft 40. The diameter of the end portion 41 is slightly less than that of the rotation shaft 40, forming a step portion. An arc portion 42 is formed at a bottom of the end portion 41 of the rotation shaft 40. The arc portion 42 of the rotation shaft 40 contacts with a top surface of the bottom plate 24, reducing the contact area between the rotation shaft and the bottom plate 24.

Figure 5:
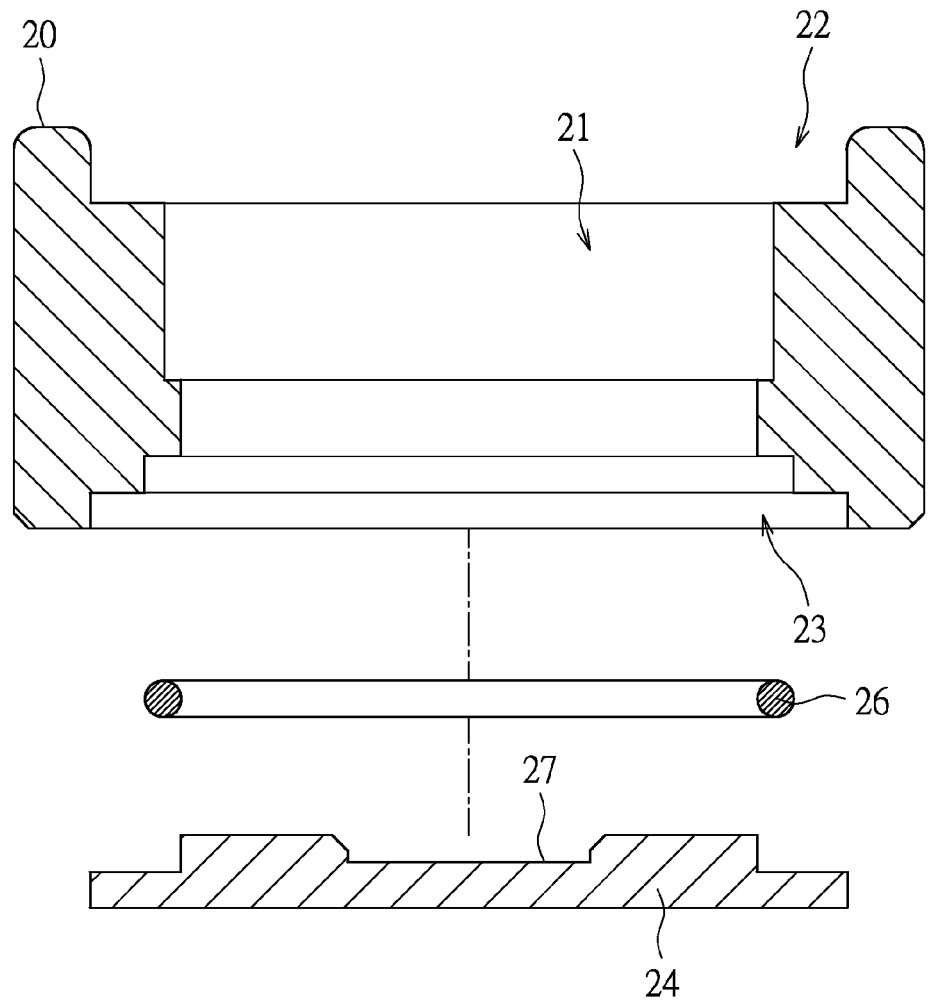
FIG. 5 is an exposed sectional view of a housing and a bottom plate for the hydrodynamic bearing structure of the present invention.

As shown in FIG. 5, in this embodiment, a lower opening 23 is provided at a bottom of the housing 20 and the bottom plate 24 is disposed at the lower opening 23 of the housing 20. A seal member 26 tightly connected between the bottom plate 24 and the housing 20 is disposed at a joint between the bottom plate 24 and the bottom of the housing 20, so that the bottom plate 24 and the housing 20 are tightly joined to prevent leakage.

Figure 6:
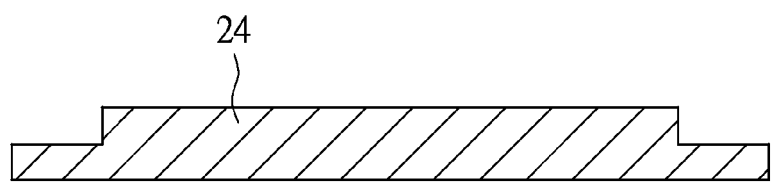
FIG. 6 is a sectional view of another variation of a bottom plate for the hydrodynamic bearing structure of the present invention.

As shown in FIG. 5, a recessed portion 27 corresponding to the arc portion 42 of the rotation shaft may be disposed in the center of the top surface of the bottom plate 24; alternatively, as shown in FIG. 6, the top surface of the bottom plate 24 may also be made to have completely flat construction.

As shown in FIG. 2, the recessed portion 27 disposed in the top surface of the bottom plate 24 can accommodate the arc portion 42 at the bottom of the rotation shaft 40. The recessed portion 27 can function to not only position an end of the rotation shaft 40, but also allow a suitable gap between a bottom surface of the thrust member 50 and the top surface of the bottom plate 24 by changing the depth of the end portion 41 of the rotation shaft 40 engaged in the recessed portion 27, so that when the thrust member 50 rotates, an oil layer applied with pressure can also be formed between the bottom surface of the thrust member 50 and the top surface of the bottom plate 24 to improve the rotation stability of the thrust member 50.

Figure 4A:
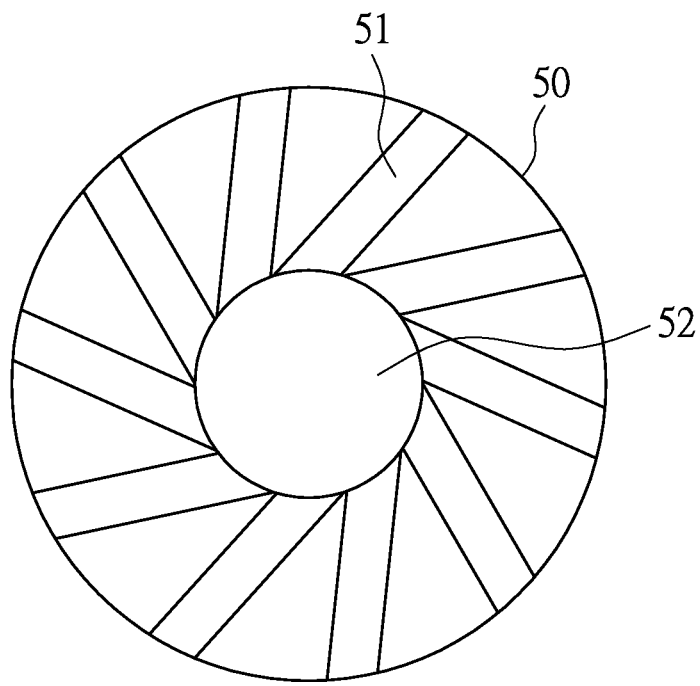
FIG. 4A is a top view of an embodiment of the thrust member of the present invention.
Figure 4B:
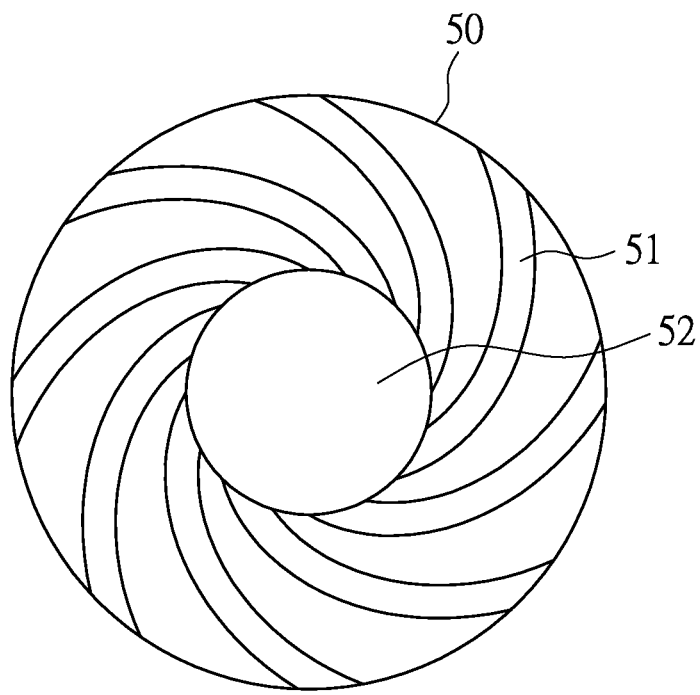
FIG. 4B is a top view of another embodiment of the thrust member of the present invention.

As shown in FIG. 2 and FIG. 3, the thrust member 50 is disposed around the end portion 41 of the rotation shaft 40. As shown in FIG. 3, FIG. 4A, and FIG. 4B, the thrust member 50 is a circular plate and a hole 52 is provided in the center of the thrust member 50 so that the thrust member 50 can be disposed around the end portion 41 at the bottom of the rotation shaft 40. The thrust member 50 is fixedly jointed to the end portion 41 of the rotation shaft 40 through close fit or dispensing. As shown in FIG. 2, the thrust member 50 is accommodated in a gap between the bottom surface of the hydrodynamic bearing 30 and the bottom plate 24, and a top surface of the thrust member 50 is adjacent to the bottom surface of the hydrodynamic bearing 30 or the bottom surface of the thrust member 50 is adjacent to the top surface of the bottom plate 24.

A space between the bottom surface of the hydrodynamic bearing 30 and the top surface of the bottom plate 24, in the accommodating space 21 of the hydrodynamic bearing structure 10 of the present invention is filled with a lubricating oil, so that the rotation shaft 40 and the thrust member 50 are both immersed in the lubricating oil. As shown in FIG. 2, a herringbone groove 32 may be further disposed in a surface of the rotation shaft hole 31 of the hydrodynamic bearing 30, so that when the rotation shaft 40 rotates, the herringbone groove 32 can guide the lubricating oil to flow and press the lubricating oil, thereby forming an oil layer between a surface of the rotation shaft 40 and the rotation shaft hole 31. Therefore, the rotation shaft 40 will not contact the rotation shaft hole 31 during operation. However, the construction shape of the herringbone groove 32 in the surface of the rotation shaft hole 31 of the hydrodynamic bearing 30 is not a technical feature of this application, and thus is not described in detail herein.

Figure 3A:
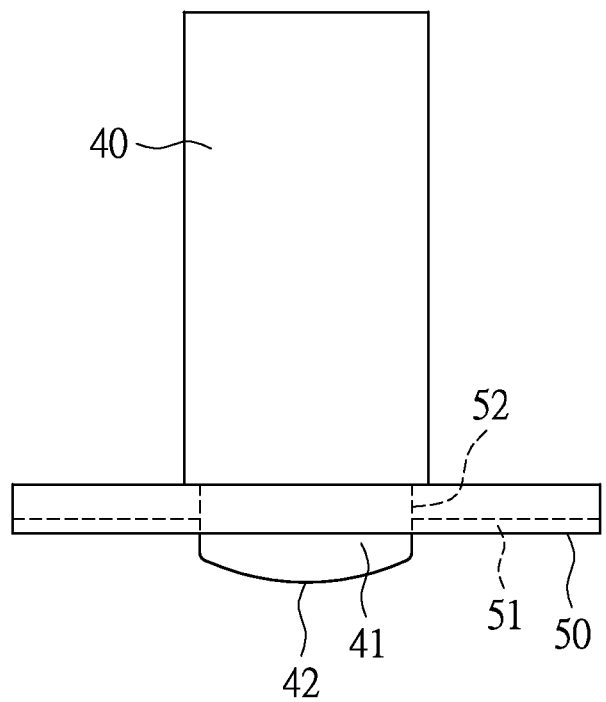
FIG. 3A is an assembled side view showing that guiding grooves are disposed in a bottom surface of the thrust member.

As shown in FIG. 3 and FIG. 3A, a plurality of guiding grooves 51 are disposed in the top surface or the bottom surface of the thrust member 50. The guiding grooves 51 are radially arranged in the top surface of the thrust member 50 (as shown in FIG. 3) or the bottom surface of the thrust member 50 (as shown in FIG. 3A), and the guiding grooves 51 may be linear grooves as shown in FIG. 4A and may also be arc-shaped grooves as shown in FIG. 4B. It should be noted here that, the guiding grooves 51 are not limited to having the shapes disclosed above and may be designed to have any suitable shape according to practical requirements.

The guiding groove 51 functions to guide the lubricating oil to flow and press the lubricating oil, so that an oil layer applied with pressure is formed on a surface of the thrust member 50 to maintain the stability of the thrust member 50 and the rotation shaft 40 during operation.

Figure 7:
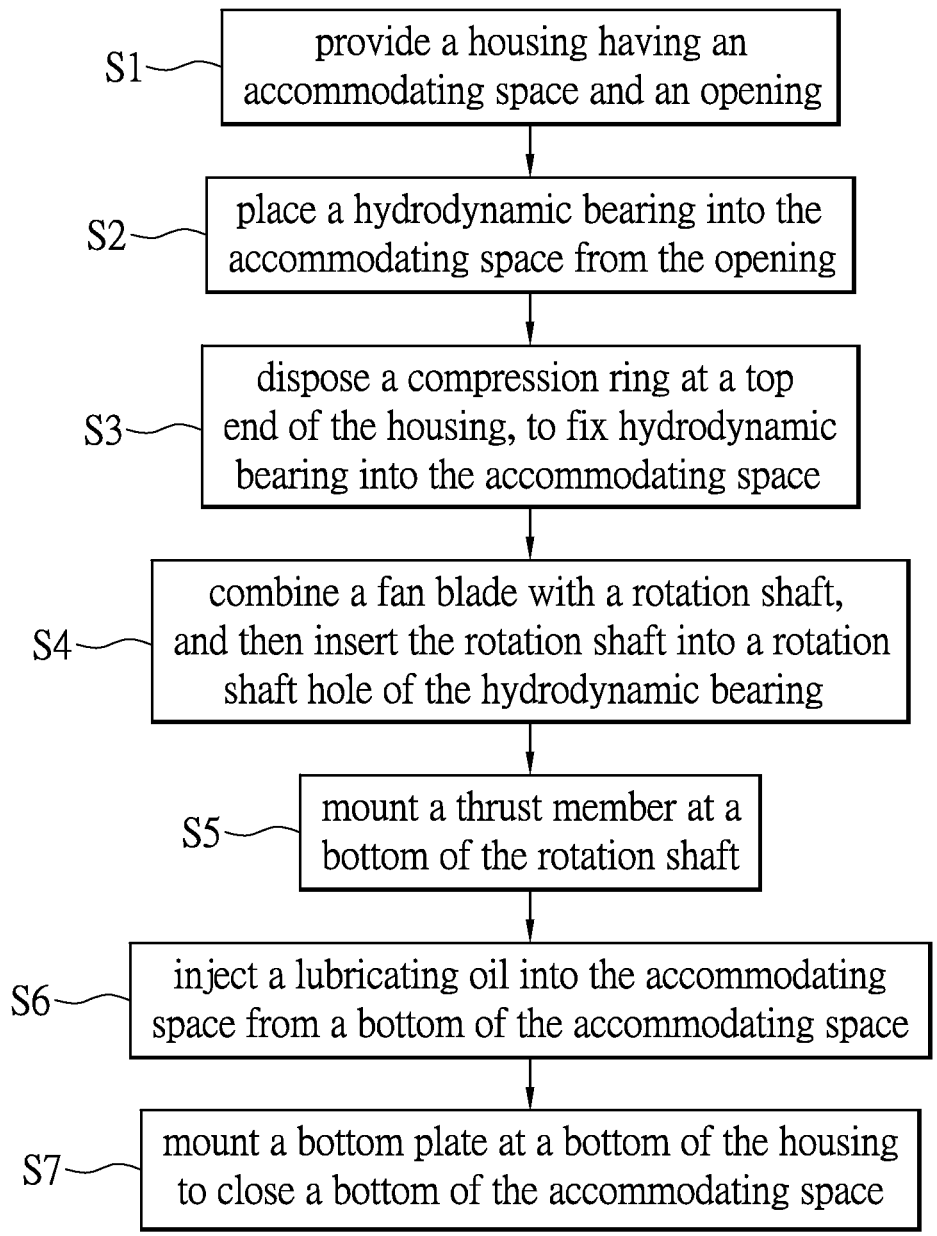
FIG. 7 is a flow chart of assembling the hydrodynamic bearing structure of the present invention.
Figure 8:
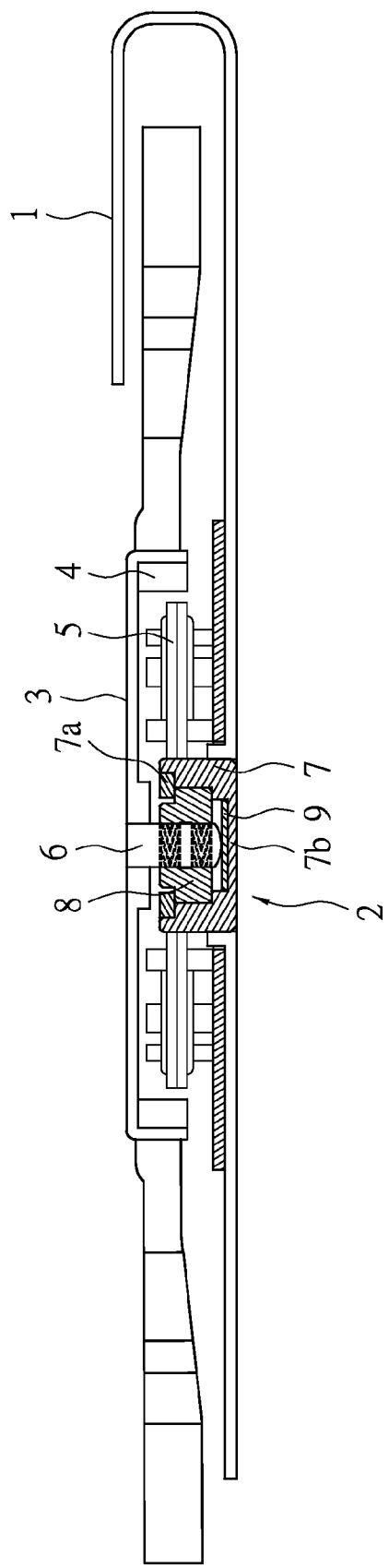
FIG. 8 is an assembled sectional schematic view showing that a conventional hydrodynamic bearing structure used for a cooling fan is mounted on the cooling fan.
Figure 9:
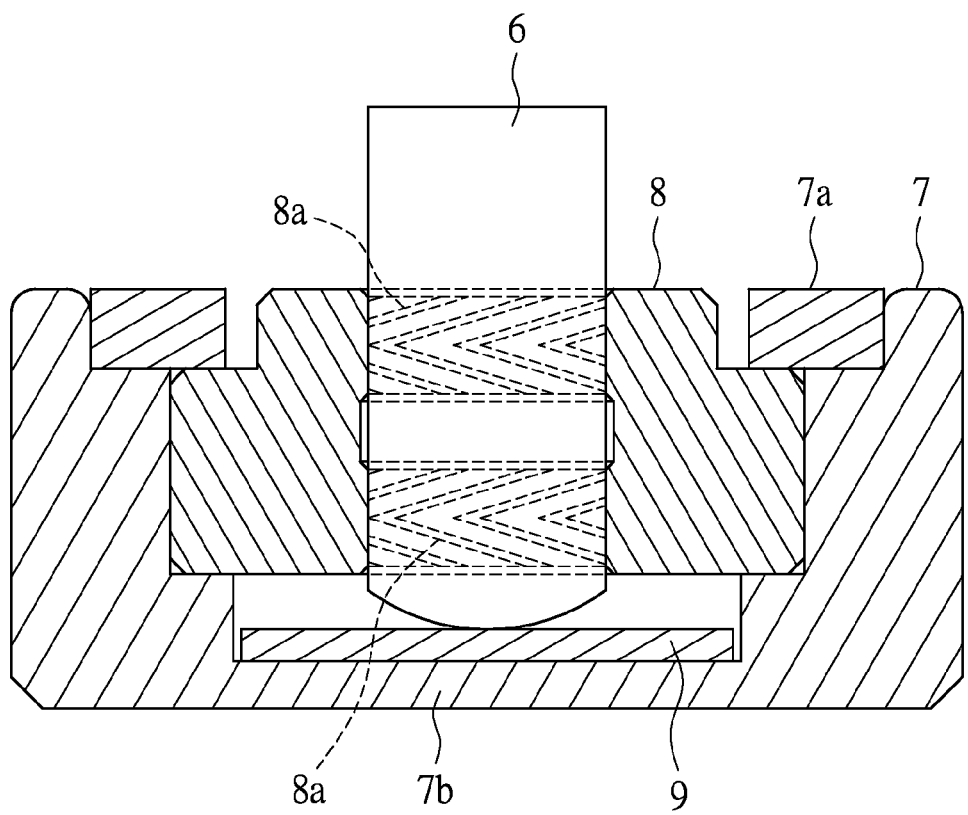
FIG. 9 is an assembled sectional view of the conventional hydrodynamic bearing structure.
Figure 9A:
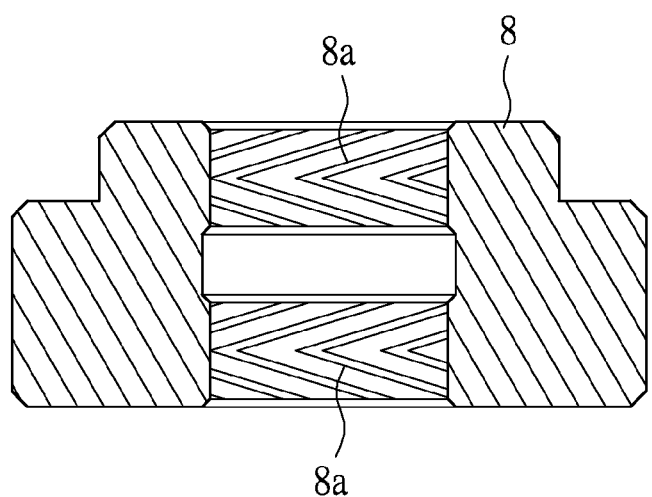
FIG. 9A is a sectional view of a hydrodynamic bearing for the conventional hydrodynamic bearing structure.

FIG. 7 is a flow chart of assembling a hydrodynamic bearing structure of the present invention. Referring to FIG. 7, the assembling method comprises the steps of:
1. providing a housing 20;
2. placing a hydrodynamic bearing 30 into an accommodating space 21 from an upper opening 22 located at a top end of the housing 20;
3. disposing a compression ring 25 at the top end of the housing 20 to fix a position of the hydrodynamic bearing 30;
4. combining a rotation shaft 40 with a fan blade 3 and then inserting the rotation shaft 40 together with the fan blade 3 into a rotation shaft hole 31 of the hydrodynamic bearing 30;
5. placing a thrust member 50 from a lower opening 23 at a bottom of the housing 20 and mounting the thrust member 51 on an end portion 41 at a bottom of the rotation shaft 40;
6. injecting a lubricating oil into the accommodating space from the lower opening 23 at the bottom of the housing 20; and
7. after the lubricating oil is injected, mounting a bottom plate 24 and a seal member 26 to the lower opening 23 at the bottom of the housing 20 to close a bottom of the accommodating space 21.

Possible Effects of the Embodiment

According to the present invention, the thrust member 50 cooperates with the bottom surface of the hydrodynamic bearing 30 or the top surface of the bottom plate 24 and the guiding grooves 51 in the surface of the thrust member 50 cooperates with the bottom surface of the hydrodynamic bearing 30 or the top surface of the bottom plate 24, so that the lubricating oil layer applied with pressure is formed at the top surface or the bottom surface of thrust member 50, generating an axial positioning function, and maintaining stability of the thrust member 50 and the rotation shaft 40 during operation. Therefore, deflection and vibration do not easily occur when the fan blade 3 rotates.

The description above is only preferred embodiments of the present invention and is not intended to limit the scope of the present invention. All equivalent technical changes made according to the specification and drawings of the present invention should fall within the scope of the present invention.

What is claimed is:

1. A hydrodynamic bearing structure for bearing a cooling fan, comprising:
  a housing having a cylindrical accommodating space, wherein an upper opening communicating with the accommodating space is provided at an upper end of the housing;
  a bottom plate disposed on a bottom of the housing, wherein the bottom plate is tightly fit to the bottom of the housing;
  a hydrodynamic bearing, disposed in the accommodating space, wherein a rotation shaft hole extending through a top surface and a bottom surface of the hydrodynamic bearing is provided in the center of the hydrodynamic bearing;
  a rotation shaft, disposed in the rotation shaft hole of the hydrodynamic bearing, wherein an upper end of the rotation shaft protrudes from the top surface of the hydrodynamic bearing, and a bottom end of the rotation shaft protrudes from the bottom surface of the hydrodynamic bearing and contacts a top surface of the bottom plate; and
  a thrust member, fixedly connected to the bottom end of the rotation shaft and accommodated between the bottom surface of the hydrodynamic bearing and the bottom plate, wherein
  a space in the accommodating space between the bottom surface of the hydrodynamic bearing and the top surface of the bottom plate is filled with a lubricating oil;
  wherein the top surface of the bottom plate has a middle area and a peripheral area surrounding the middle area, the thrust member has a peripheral area on a bottom surface thereof, and a distance between the peripheral area of the thrust member and the peripheral area of the bottom plate is smaller than a distance between the peripheral area of the thrust member and the middle area of the bottom plate.

2. The hydrodynamic bearing structure for bearing a cooling fan according to claim 1, wherein the thrust member is a circular plate and a plurality of radially arranged guiding grooves are disposed on the top surface, the bottom surface of the thrust member or on both the top surface and the bottom surface of the thrust member.

3. The hydrodynamic bearing structure for bearing a cooling fan according to claim 2, wherein a seal member tightly connected between the bottom plate and the housing is disposed at a joint between the bottom plate and the housing.

4. The hydrodynamic bearing structure for bearing a cooling fan according to claim 3, wherein the bottom plate is an anti-friction plate.

5. The hydrodynamic bearing structure for bearing a cooling fan according to claim 4, wherein a recessed portion is provided in the top surface of the bottom plate and an arc portion is provided at a bottom of the rotation shaft, the arc portion abuts against the recessed portion.

6. The hydrodynamic bearing structure for bearing a cooling fan according to claim 5, wherein a lower opening communicating with the accommodating space is provided at a lower end of the housing, the lower opening being closed by the bottom plate.

7. The hydrodynamic bearing structure for bearing a cooling fan according to claim 6, wherein the plurality of guiding grooves are linear grooves.

8. The hydrodynamic bearing structure for bearing a cooling fan according to claim 6, wherein the plurality of guiding grooves are arc-shaped grooves.

9. A method for assembling a hydrodynamic bearing structure for bearing a cooling fan, the method comprising the steps of:
providing a housing having a cylindrical accommodating space extending therethrough;
placing a hydrodynamic bearing into the accommodating space from an upper opening located at an upper end of the accommodating space;
disposing a compression ring at a top end of the housing, wherein the compression ring presses against a top surface of the hydrodynamic bearing to fix the hydrodynamic bearing into the accommodating space;
placing a rotation shaft into a rotation shaft hole of the hydrodynamic bearing, wherein a bottom end of the rotation shaft protrudes from a bottom surface of the hydrodynamic bearing;
mounting a thrust member at the bottom end of the rotation shaft;
injecting a lubricating oil into the accommodating space from a bottom of the accommodating space; and
mounting a bottom plate at a bottom of the housing to close a lower opening located at a lower end of the accommodating space;
wherein a top surface of the bottom plate has a middle area and a peripheral area surrounding the middle area, the thrust member has a peripheral area on a bottom surface thereof, and a distance between the peripheral area of the thrust member and the peripheral area of the bottom plate is smaller than a distance between the peripheral area of the thrust member and the middle area of the bottom plate.

* * * * *